US012671851B2

(12) United States Patent
Domae et al.

(10) Patent No.: US 12,671,851 B2
(45) Date of Patent: Jun. 30, 2026

(54) INFORMATION PROCESSING DEVICE, INFORMATION PROCESSING METHOD, AND PROGRAM

(71) Applicants: SONY GROUP CORPORATION, Tokyo (JP); Sony Interactive Entertainment Inc., Tokyo (JP)

(72) Inventors: Takuma Domae, Tokyo (JP); Junichi Tanaka, Tokyo (JP); Kazuharu Tanaka, Tokyo (JP); Masaaki Matsubara, Tokyo (JP); Yasunori Matsui, Tokyo (JP)

(73) Assignees: SONY GROUP CORPORATION, Tokyo (JP); Sony Interactive Entertainment Inc., Tokyo (JP)

( * ) Notice: Subject to any disclaimer, the term of this patent is extended or adjusted under 35 U.S.C. 154(b) by 293 days.

(21) Appl. No.: 18/276,807

(22) PCT Filed: Feb. 28, 2022

(86) PCT No.: PCT/JP2022/008144
§ 371 (c)(1),
(2) Date: Aug. 10, 2023

(87) PCT Pub. No.: WO2022/190919
PCT Pub. Date: Sep. 15, 2022

(65) Prior Publication Data
US 2024/0114181 A1 Apr. 4, 2024

(30) Foreign Application Priority Data
Mar. 9, 2021 (JP) ................................. 2021-037071

(51) Int. Cl.
| | |
|---|---|
| *G06T 19/00* | (2011.01) |
| *G06T 13/40* | (2011.01) |
| *G06V 40/20* | (2022.01) |
| *H04N 21/234* | (2011.01) |

(52) U.S. Cl.
CPC ....... *H04N 21/23412* (2013.01); *G06T 13/40* (2013.01); *G06T 19/006* (2013.01); *G06V 40/23* (2022.01)

(58) Field of Classification Search
None
See application file for complete search history.

(56) References Cited

U.S. PATENT DOCUMENTS

| | | | | |
|---|---|---|---|---|
| 2019/0333261 A1* | 10/2019 | Nakashima | ............. | G06F 3/011 |
| 2021/0366174 A1* | 11/2021 | Reilly | .................... | G06T 19/20 |

FOREIGN PATENT DOCUMENTS

| | | |
|---|---|---|
| JP | 2018-094326 A | 6/2018 |
| JP | 2021-009351 A | 1/2021 |
| WO | WO 2019/163547 A1 | 8/2019 |

* cited by examiner

*Primary Examiner* — Nicholas R Wilson
(74) *Attorney, Agent, or Firm* — Paratus Law Group, PLLC

(57) ABSTRACT

An information processing device includes a control unit that performs control to output information regarding an image of a user viewpoint in a virtual space, in which the control unit performs control to switch a display corresponding to a performer included in the image between a live-action image generated based on a captured image of the performer and a character image corresponding to the performer, according to a result of detecting a state of at least one user in the virtual space or a state of the virtual space.

21 Claims, 8 Drawing Sheets

FIG.3

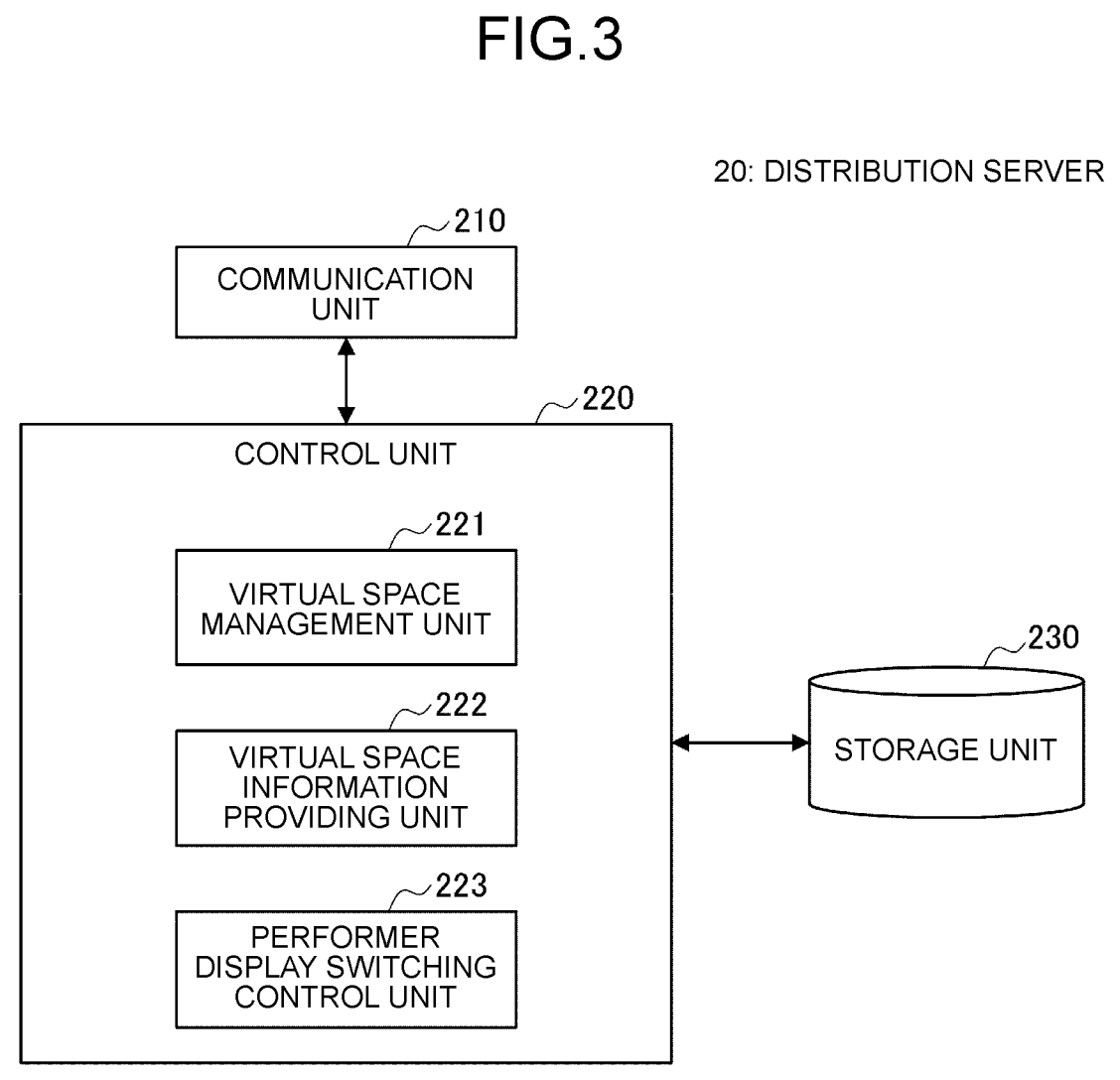

20: DISTRIBUTION SERVER

~210

COMMUNICATION
UNIT

~220

CONTROL UNIT

~221

VIRTUAL SPACE
MANAGEMENT UNIT

~222

VIRTUAL SPACE
INFORMATION
PROVIDING UNIT

~223

PERFORMER
DISPLAY SWITCHING
CONTROL UNIT

~230

STORAGE UNIT

10: USER TERMINAL

10': USER TERMINAL

COMMUNICATION UNIT ~110

OPERATION INPUT UNIT ~130

SENSOR UNIT ~140

CONTROL UNIT ~120'

VIRTUAL SPACE IMAGE DISPLAY CONTROL UNIT ~121

PERFORMER DISPLAY SWITCHING CONTROL UNIT ~122

DISPLAY UNIT ~150

SPEAKER ~160

STORAGE UNIT ~170

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2022/008144 (filed on Feb. 28, 2022) under 35 U.S.C. § 371, which claims priority to Japanese Patent Application No. 2021-037071 (filed on Mar. 9, 2021), which are all hereby incorporated by reference in their entirety.

FIELD

The present disclosure relates to an information processing device, an information processing method, and a program.

BACKGROUND

In a virtual reality (VR) technology that has become widespread in recent years, a video of an arbitrary viewpoint (free viewpoint) according to a user operation in a virtual space in which a 3D model is arranged is generated and provided to a user. The user can view the video (an image and a sound) of the virtual space by using a display device such as a smartphone, a tablet terminal, a television device, or a non-transmissive head mounted display (HMD) covering the entire field of view.

One of the methods for more enjoying an experience in a virtual space is that a plurality of users simultaneously participate in an event performed in the virtual space. For example, Patent Literature 1 below discloses that special production control for an event performed in a virtual three-dimensional space is performed on viewing positions of a plurality of participants participating in the event (positions of virtual cameras).

CITATION LIST

Patent Literature

Patent Literature 1: JP 2018-94326 A

SUMMARY

Technical Problem

For example, concerts and the like of animation characters, game characters, or the like are assumed as the event performed in the virtual space. However, in recent years, not only the popularity of a character but also the popularity of a performer (real person) who plays a character is increasing. However, an avatar for a performer, that is, a predetermined character 3D model (model data generated as a three-dimensional solid) is fixed as an appearance of a performer in the virtual space.

Therefore, the present disclosure proposes an information processing device, an information processing method, and a program capable of improving entertainment by switching an appearance of a performer in a virtual space.

Solution to Problem

According to the present disclosure, an information processing device is provided that includes: a control unit that performs control to output information regarding an image of a user viewpoint in a virtual space, wherein the control unit performs control to switch a display corresponding to a performer included in the image between a live-action image generated based on a captured image of the performer and a character image corresponding to the performer, according to a result of detecting a state of at least one user in the virtual space or a state of the virtual space.

According to the present disclosure, an information processing method executed by a processor is provided that includes: performing control to output information regarding an image of a user viewpoint in a virtual space; and performing control to switch a display corresponding to a performer included in the image between a live-action image generated based on a captured image of the performer and a character image corresponding to the performer, according to a result of detecting a state of at least one user in the virtual space or a state of the virtual space.

According to the present disclosure, a program is provided that causes a computer to function as: a control unit that performs control to output information regarding an image of a user viewpoint in a virtual space, wherein the control unit performs control to switch a display corresponding to a performer included in the image between a live-action image generated based on a captured image of the performer and a character image corresponding to the performer, according to a result of detecting a state of at least one user in the virtual space or a state of the virtual space.

BRIEF DESCRIPTION OF DRAWINGS

FIG. 3 is a block diagram illustrating an example of a configuration of a distribution server according to the present embodiment.

DESCRIPTION OF EMBODIMENTS

Hereinafter, preferred embodiments of the present disclosure will be described in detail with reference to the accompanying drawings. In the present specification and the drawings, constituent elements having substantially the same functional configuration are denoted by the same reference signs, and an overlapping description is omitted.

Further, the description will be given in the following order.

1. Overview of Information Processing System According to Embodiment of Present Disclosure
2. Configuration Example
3. Operation Processing
3-1. Operation Processing at the time of Live Distribution
3-2. Operation Processing at the time of Recording Distribution
4. Modified Example
4-1. Case where Switching Control is Performed by User Terminal
4-2. Application to Augmented Reality (AR)
5. Supplement

Figure 1:
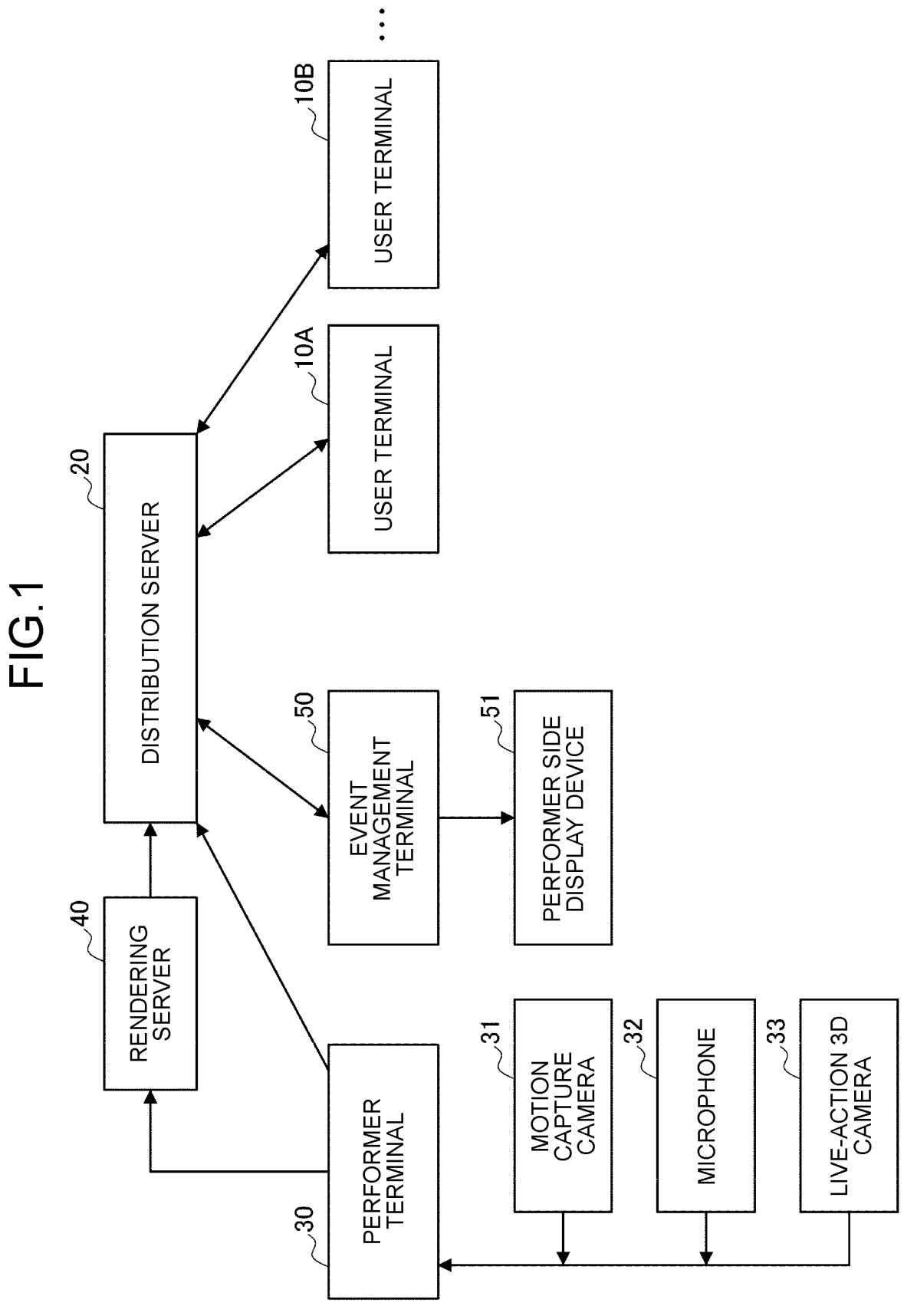
FIG. 1 is a diagram for describing an overview of an information processing system according to an embodiment of the present disclosure.

1. Overview of Information Processing System According to Embodiment of Present Disclosure FIG. 1 is a diagram for describing an overview of an information processing system according to an embodiment of the present disclosure. As illustrated in FIG. 1, the information processing system according to the present embodiment includes a user terminal 10, a distribution server 20, a performer terminal 30, a rendering server 40, and an event management terminal 50.

The distribution server 20 is an information processing device that manages a virtual space (virtual reality (VR)) in which 3D models are arranged and distributes a video of an arbitrary viewpoint (a performer viewpoint or a user viewpoint) in the virtual space. The distribution server 20 may be a distribution system including a plurality of servers.

The user terminal 10 is an information processing terminal used by a user, and is implemented by, for example, a smartphone, a tablet terminal, a personal computer (PC), a non-transmissive head mounted display (HMD) covering the entire field of view, a transmissive glasses-type device, a projector, or the like. The user terminal 10 outputs video data (image) of the user viewpoint in the virtual space and a sound received from the distribution server 20 (display output and sound output). In addition, the user terminal 10 acquires input information for the virtual space from the user and transmits the input information to the distribution server 20. The distribution server 20 changes the user viewpoint (a position and direction of a virtual camera) in the virtual space or reflects the user viewpoint on a 3D object in the virtual space according to the input information from the user. Furthermore, a user avatar serving as a virtual self of the user may exist in the virtual space. The user avatar is included in the 3D objects arranged in the virtual space, and is generated by, for example, a character 3D model. The user avatar makes a motion, changes an expression, or moves according to the input information from the user. The user viewpoint (the position and direction of the virtual camera) in the virtual space may be a viewpoint of the user avatar, or may be a viewpoint that fits the user avatar within the angle of view.

The performer terminal 30 acquires input information from a performer and transmits the input information to the distribution server 20. In the virtual space, there is a performer avatar serving as a virtual self of the performer, and the performer avatar makes a motion, changes an expression, or moves according to the input information from the performer. The performer avatar is included in the 3D objects arranged in the virtual space. Examples of the input information transmitted to the distribution server 20 include motion data (motions of the limbs, a motion of the head, a facial expression, a change in posture, and the like) indicating the motion of the performer and sound data. For example, the performer avatar is generated by 3D model data, and the performer avatar can be moved by applying the motion data of the performer.

The motion data is acquired by, for example, a motion capture camera 31 that images the performer in the real space. In the present embodiment, a case where the motion data is acquired by a camera is described as an example, but the present disclosure is not limited thereto. For example, the motion data of the performer may be acquired by various sensors (an acceleration sensor, a gyro sensor, or the like) attached to the performer. Furthermore, the motion data of the performer may be acquired by combining various sensors and a camera.

The sound data is acquired by a microphone 32 attached to the performer himself/herself, held by the performer, or arranged around the performer in the real space. Sounds collected by a plurality of microphones 32 arranged in the real space may be synthesized and transmitted to the distribution server 20. In addition, sound data (audio data) output from a musical instrument played by the performer, a CD player, a digital player, or the like is also transmitted to the distribution server 20 by the performer terminal 30 as the sound data provided from the performer. Furthermore, the sound data transmitted from the performer terminal 30 to the distribution server 20 may be a sound obtained by individually adjusting various sound sources by a mixer arranged in the real space and then mixing the various sound sources.

The event management terminal 50 is an information processing terminal used at the time of operating progress and production of an event performed in the virtual space. The event management terminal 50 is operated by, for example, an event manager. The event manager may be the performer himself or herself or a person other than the performer. A person involved in holding of an event including a performer who appears in the event and a manager is also widely referred to as a distributor side.

Furthermore, the video and the sound of the event performed in the virtual space can be transmitted from the distribution server 20 to the event management terminal 50. The event video may be a video of a plurality of viewpoints in the virtual space. For example, the event video may be a video (a video of the performer viewpoint) of audience seats (for example, an area where the user avatar is arranged) viewed from a stage in a venue of the event performed in the virtual space. In addition, the event video may be a video of the stage viewed from the front, from the side, or from above. Furthermore, the event video may be a video in which the entire event venue including the stage and the audience seats can be seen. Such an event video may be displayed on a display unit of the event management terminal 50, or may be displayed on a performer side display device 51 arranged at a position where the performer can be easily seen in the real space or the like. Furthermore, a plurality of performer side display devices 51 may be prepared, and event videos of different viewpoints in the virtual space may be displayed. The performer can check a state of an audience (user avatar) in the virtual space, a state of the stage, a state of the performer avatar of the performer, and the like in real time by viewing the performer side display device 51.

Furthermore, in the present embodiment, it is also possible to generate a live-action 3D model of the performer as the performer avatar by using a technology (for example, a volumetric capture technology) that converts the performer, which is a subject, into 3DCG based on a large number of live-action videos (captured images) obtained by imaging the performer, and arrange the live-action 3D model in the virtual space. Data for generating the live-action 3D model can be acquired by a live-action 3D camera 33. In the real space, for example, tens of live-action 3D cameras 33 are installed around the performer, and capture images of the performer from various angles. The captured data (imaging data) is transmitted to the rendering server 40 by the performer terminal 30, and the live-action 3D model is generated in the rendering server 40. The rendering server 40 may be a cloud server including a plurality of servers. Then, the live-action 3D model generated by the rendering server 40 is output to the distribution server 20. Furthermore, the capturing of the live-action video by the live-action 3D camera 33 according to the present embodiment, the generation of the live-action 3D model based on the imaging data of the live-action video by the rendering server 40, and the arrangement of the live-action 3D model in the virtual space in the distribution server 20 can be performed in real time.

(Summary of Problems)

As described above, in recent years, not only the popularity of animation characters, games characters, or the like but also the popularity of performers (real persons) who play characters has increased. However, an associated avatar (character 3D model) is fixed as an appearance of a performer in the virtual space.

In this regard, with the information processing system according to the present disclosure, it is possible to improve entertainment by switching an appearance of a performer in a virtual space.

Figure 2:
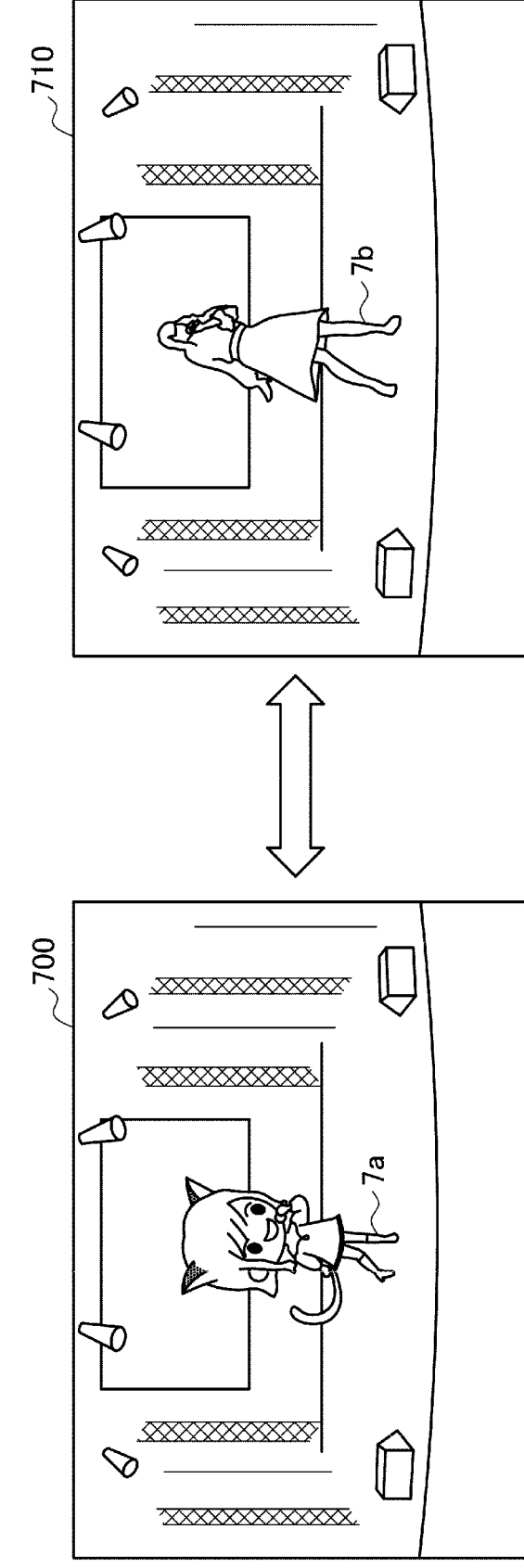
FIG. 2 is a diagram for describing switching of an appearance of a performer in an event performed in a virtual space according to the present embodiment.

FIG. 2 is a diagram for describing switching of an appearance of a performer in an event performed in a virtual space according to the present embodiment. A video 700 in a case where the performer avatar is displayed as a character 3D model 7a is illustrated on the left side of FIG. 2, and a video 710 in a case where the performer avatar is displayed as a live-action 3D model 7b is illustrated on the right side of FIG. 2. Switching between displaying the performer avatar as the character 3D model 7a and displaying the performer avatar as the live-action 3D model 7b may be arbitrarily (individually) performed for each user, or may be uniformly controlled on the distributor side. Furthermore, the switching may be automatically controlled according to a state of the user avatar in the virtual space or a state of the event performed in the virtual space.

The overview of the information processing system according to the embodiment of the present disclosure has been described above. Subsequently, a specific configuration of each device included in the information processing system according to the present embodiment will be described with reference to the drawings.

2. Configuration Example

2-1. Configuration Example of Distribution Server 20

FIG. 3 is a block diagram illustrating an example of a configuration of the distribution server 20 according to the present embodiment. The distribution server 20 is a server that is communicably connected to the user terminal 10, the rendering server 40, and the event management terminal 50 via a network. The distribution server 20 may be a cloud server including a plurality of servers.

As illustrated in FIG. 3, the distribution server 20 includes a communication unit 210, a control unit 220, and a storage unit 230.

(Communication Unit 210)

The communication unit 210 transmits and receives data to and from an external device in a wired or wireless manner. The communication unit 210 is communicably connected to the user terminal 10, the rendering server 40, and the event management terminal 50 by using, for example, a wired/wireless local area network (LAN), Wi-Fi (registered trademark), Bluetooth (registered trademark), a mobile communication network (long term evolution (LTE), the fourth generation mobile communication system (4G), and the fifth generation mobile communication system (5G)), or the like.

(Control Unit 220)

The control unit 220 functions as an arithmetic processing device and a control device, and controls an overall operation in the distribution server 20 according to various programs. The control unit 220 is implemented by, for example, an electronic circuit such as a central processing unit (CPU) or a microprocessor. Furthermore, the control unit 220 may include a read only memory (ROM) that stores programs, operational parameters, and the like to be used, and a random access memory (RAM) that temporarily stores parameters and the like that change as appropriate.

Furthermore, the control unit 220 according to the present embodiment also functions as a virtual space management unit 221, a virtual space information providing unit 222, and a performer display switching control unit 223.

The virtual space management unit 221 manages a virtual space. Specifically, the virtual space management unit 221 acquires, adds, updates, and the like various types of information (information of 3D objects arranged in a virtual space, and the like) for generating (constructing) the virtual space. For example, the virtual space management unit 221 appropriately reflects input information transmitted from the user terminal 10, the performer terminal 30, the rendering server 40, and the event management terminal 50 in the virtual space. For example, the virtual space management unit 221 moves the limbs or posture of a user avatar of a user arranged in the virtual space or moves the position of the user avatar forward, backward, leftward, or rightward in accordance with the input information from the user terminal 10 (also changes the position of a virtual camera corresponding to the user viewpoint in accordance with the input information). In addition, the virtual space management unit 221 controls execution of an event in the virtual space in accordance with the information transmitted from the event management terminal 50. The event performed in the virtual space is assumed to be, for example, a concert, a lecture, a play, a festival, or various other events. Furthermore, the virtual space management unit 221 grasps the IDs, positions, and the like of the performer and each user avatar in the virtual space.

The virtual space information providing unit 222 provides information regarding the virtual space to the user terminal 10 and the event management terminal 50. The information regarding the virtual space may be information stored in the storage unit 230 or may be information generated by the virtual space information providing unit 222 based on the information stored in the storage unit 230. More specifically, the information regarding the virtual space may be video data of the user viewpoint in the virtual space. The video data of each user viewpoint in the virtual space is continuously transmitted to each user terminal 10 in real time (so-called VR streaming distribution) and displayed on each user terminal 10, so that a plurality of users can share the same virtual space and simultaneously view the video data.

Furthermore, the information regarding the virtual space may be data for generating a video of the user viewpoint in the virtual space. Examples of the data for generating the video of the user viewpoint in the virtual space include position/posture information of each 3D object (including avatars of performers and other users) arranged in the virtual space, three-dimensional position coordinates of the virtual camera corresponding to the user viewpoint in the virtual space, and the like. Such data is continuously transmitted to each user terminal 10 in real time, and the video of the user viewpoint is generated and displayed in real time in each user terminal 10, so that a plurality of users can share the same virtual space and simultaneously view the video. The user terminal 10 can also acquire information for constructing the virtual space from the distribution server 20 in advance before participating in the event, and construct the virtual space locally. In this case, during the event, update information of the virtual space (information regarding a change in virtual space or the like) is continuously transmitted from the distribution server 20, and the user terminal 10 updates the locally constructed virtual space based on the update information. Furthermore, the user terminal 10 controls the position and direction of the virtual camera in the locally constructed virtual space according to the input information from the user, and can generate and display the video of the user viewpoint.

The performer display switching control unit 223 controls switching of whether to display the performer avatar in the virtual space as the character 3D model or the live-action 3D model. The switching may be performed according to an instruction from the user or may be performed according to an instruction from the distributor side. Furthermore, the performer display switching control unit 223 may automatically control the switching in a case where at least one of the state of at least one user avatar in the virtual space or the state of the event performed in the virtual space satisfies a condition. The switching between the character 3D model and the live-action 3D model may be controlled for each user. In other words, the performer avatar may be seen as the character 3D model in the field of view of a certain user (the video of the user viewpoint in the virtual space), while the performer avatar may be seen as the live-action 3D model in the field of view of another user. As a result, it is possible to implement production (display) that suits the preference of each user, and it is possible to prevent a switching instruction of one user from affecting another user. On the other hand, it is also possible to uniformly control switching between the character 3D model and the live-action 3D model for all users. As a result, for example, it is possible to implement production in which switching from a situation where the character 3D model is displayed to a situation in which the live-action 3D model is displayed is performed for all users at a specific timing during the event.

A trigger of the switching according to the present embodiment will be described in detail. As described above, examples of the trigger include an instruction from the user. For example, the user explicitly instructs the switching by operating the user terminal 10 to select a switching button displayed on the screen, operating a controller, making a predetermined gesture, or the like. Furthermore, the user may give an instruction to switch the virtual camera corresponding to the user viewpoint to a designated camera (one of the virtual cameras) set for live-image viewing. Alternatively, in a case where the user avatar has succeeded in any challenge in the virtual space (a case where winning determination is made, a case where a condition is satisfied, or the like), the performer display switching control unit 223 may perform the switching. For example, in a case where the user avatar throws any item and hits the performer avatar, the switching may be performed for a certain period of time. Furthermore, the switching may be performed for a certain period of time according to a charge amount of the user avatar in the virtual space. Furthermore, a text amount of a cheering message sent by the user to the performer during the event exceeds a predetermined value. In a case where the display of the performer avatar is switched according to an individual instruction, a motion, or the like of the user, the performer display switching control unit 223 may perform control to perform switching between the character 3D model and the live-action 3D model for each user (which does not affect the fields of view of other users).

Furthermore, as another example, the performer display switching control unit 223 may perform the switching in a case where a state of at least one user avatar in the virtual space satisfies a predetermined condition. The predetermined condition is not particularly limited, but may be, for example, detection of a certain number of user avatars which have made the same motion. Furthermore, the predetermined condition may be detection of a certain number of user avatars which have simultaneously made a motion designated by the performer. Excitement (the amplitude of a motion of the user avatar, the number of jumps, applause, and the like) of all the event participants in the virtual space may be set as the predetermined condition. Furthermore, the predetermined condition may also be a text amount of cheering messages that exceeds a predetermined value, the cheering messages being sent from all the users to the performer during the event. The predetermined condition may also be the number of event participants (the number of user avatars in the audience seats of the event) that exceeds a predetermined value. In a case where the display of the performer avatar is switched depending on situations of a large number of user avatars, the performer display switching control unit 223 may perform control to uniformly perform switching between the character 3D model and the live-action 3D model for all users (a sense of unity of the participants is created).

Furthermore, as another example, the performer display switching control unit 223 may perform the switching in accordance with a state of an event that is performed in the virtual space. For example, the performer display switching control unit 223 may perform the switching between the character 3D model and the live-action 3D model in a case where a specific production occurs in the event or in a specific time zone (between choruses or the like) in a predetermined music played (reproduced) in the event.

Furthermore, the performer display switching control unit 223 may switch a stage background or a background of the event venue to a virtual background (a background generated by 3DCG) or a live-action background (live 2D/3D video) in accordance with the switching between the character 3D model and the live-action 3D model. The live-action background can be generated in advance.

In accordance with the switching control performed by the performer display switching control unit 223 described above, the virtual space information providing unit 222 generates a video in which the display of the performer avatar is switched to the character 3D model or the live-action 3D model, and transmits the video to the user terminal 10. Data of the character 3D model is stored in the storage unit 230 of the distribution server 20, and the virtual space information providing unit 222 can make the character 3D model arranged in the virtual space make a motion in real time based on the motion data transmitted from the performer terminal 30. Furthermore, the live-action 3D model can be generated in real time in the rendering server 40 and transmitted to the distribution server 20. The character 3D model and the live-action 3D model are associated with the 1D or the standing position (3D coordinate position) of the corresponding performer.

Alternatively, the virtual space information providing unit 222 may transmit an instruction to switch the display of the performer avatar to the user terminal 10. For example, in a case where the virtual space information providing unit 222 transmits, to the user terminal 10, data for generating the video of the user viewpoint in the virtual space, and the video is generated by the user terminal 10, the "instruction to switch the display of the performer avatar" may be included in the data transmitted to the user terminal 10. In this case, the data of the character 3D model of the performer is transmitted to the user terminal 10 in advance (before the start of the event or the like), and real-time motion data of the performer is transmitted to the user terminal 10, so that the character 3D model arranged in the virtual space can make a motion in the user terminal 10. Furthermore, the virtual space information providing unit 222 may continuously transmit the data to be transmitted to the user terminal 10, including the live-action 3D model, or may transmit the data only while switching to the live-action 3D model is being performed.

(Storage Unit 230)

The storage unit 230 is implemented by a read only memory (ROM) that stores programs, operational parameters, and the like used for processing in the control unit 220, and a random access memory (RAM) that temporarily stores parameters and the like that change as appropriate. According to the present embodiment, the storage unit 230 stores the information regarding the virtual space.

Although the configuration of the distribution server 20 has been described above in detail, the configuration of the distribution server 20 according to the present disclosure is not limited to the example illustrated in FIG. 3. For example, the distribution server 20 may be implemented by a plurality of devices. Furthermore, the control unit 220 may perform generation of the live-action 3D model by the rendering server 40. Furthermore, the user terminal 10 may execute at least some of the functions of the control unit 220.

2-2. Configuration Example of User Terminal 10

Figure 4:
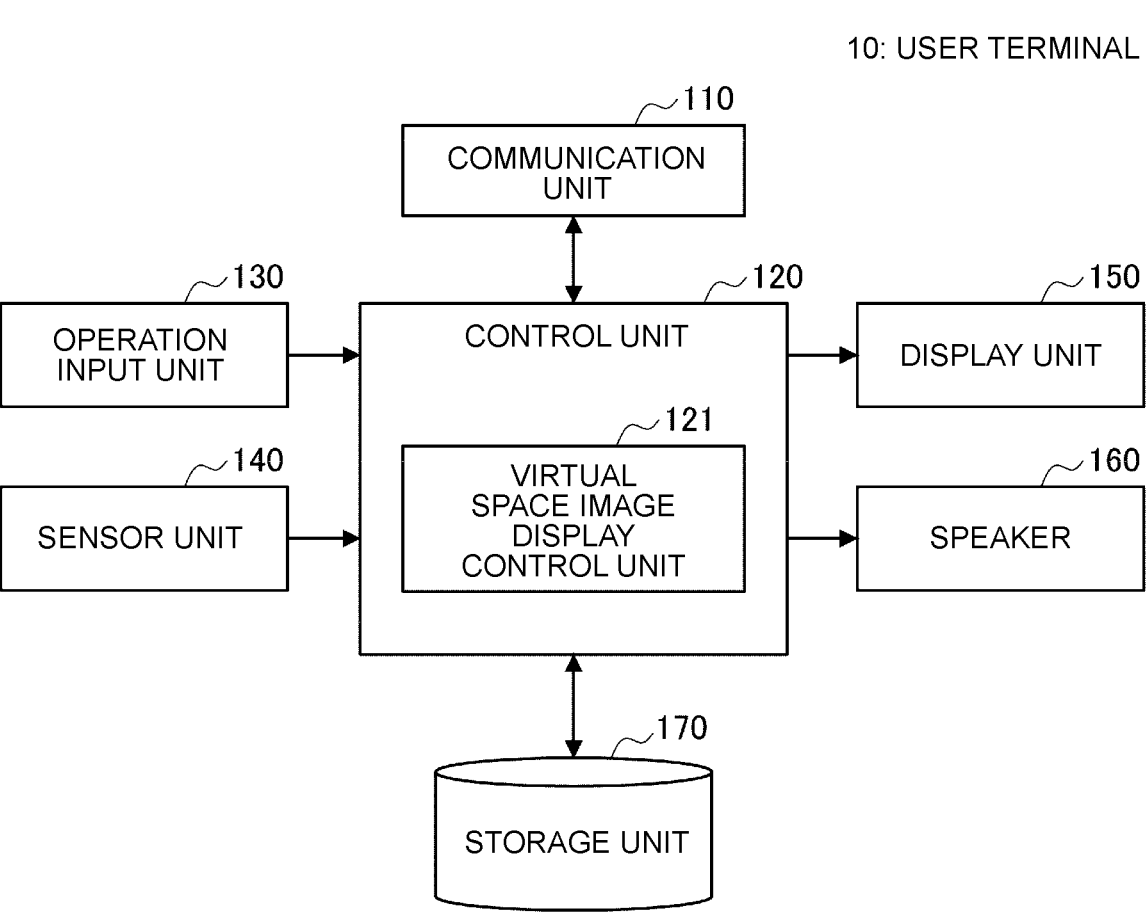
FIG. 4 is a block diagram illustrating an example of a configuration of a user terminal according to the present embodiment.

FIG. 4 is a block diagram illustrating an example of a configuration of the user terminal 10 according to the present embodiment. As illustrated in FIG. 4, the user terminal 10 includes a communication unit 110, a control unit 120, an operation input unit 130, a sensor unit 140, a display unit 150, a speaker 160, and a storage unit 170.

(Communication Unit 110)

The communication unit 110 is communicably connected to the distribution server 20 in a wired or wireless manner to transmit and receive data. The communication unit 110 can perform communication using, for example, a wired/wireless local area network (LAN), Wi-Fi (registered trademark), Bluetooth (registered trademark), infrared communication, a mobile communication network (the fourth-generation mobile communication system (4G) or the fifth-generation mobile communication system (5G)), or the like.

(Control Unit 120)

The control unit 120 functions as an arithmetic processing device and a control device, and controls an overall operation in the user terminal 10 according to various programs. The control unit 120 is implemented by, for example, an electronic circuit such as a central processing unit (CPU) or a microprocessor. Furthermore, the control unit 120 may include a read only memory (ROM) that stores programs, operational parameters, and the like to be used, and a random access memory (RAM) that temporarily stores parameters and the like that change as appropriate.

The control unit 120 according to the present embodiment performs control to transmit input information (operation input information, motion data, and the like) for the virtual space input from the operation input unit 130 or the sensor unit 140 from the communication unit 110 to the distribution server 20. Furthermore, the control unit 120 may transmit the input information (operation input information, motion data, and the like) for the virtual space to the user terminal 10 based on information acquired from an external device such as a sensor device worn by the user, a camera arranged around the user, or a controller held by the user. The input information of the user transmitted to the distribution server 20 may include an instruction to switch the display of the performer avatar.

Furthermore, the control unit 120 can also function as a virtual space image display control unit 121. The virtual space image display control unit 121 performs control to display the video data of the user viewpoint in the virtual space transmitted from the distribution server 20 (so-called VR streaming distribution) on the display unit 150.

Alternatively, the virtual space image display control unit 121 performs control to generate the video data of the user viewpoint in the virtual space based on information for generating the video data of the user viewpoint in the virtual space transmitted from the distribution server 20 and display the video data on the display unit 150. The virtual space image display control unit 121 may locally construct the virtual space based on the information received from the distribution server 20 (update is also performed based on update information continuously transmitted in real time from the distribution server 20). Furthermore, the virtual space image display control unit 121 may transmit, to the distribution server 20 (for synchronization), the input information (operation input information, motion data, or the like) for the virtual space acquired from the operation input unit 130, the sensor unit 140, the sensor device worn by the user, the controller held by the user, or the like, and control the motion and movement of the user avatar arranged in the locally constructed virtual space.

The control unit 120 also performs control to reproduce, from the speaker 160, sound data transmitted from the distribution server 20 together with the video data of the user viewpoint in the virtual space.

(Operation Input Unit 130)

The operation input unit 130 receives an operation instruction of the user and outputs an operation content to the control unit 120. The operation input unit 130 may be, for example, a touch sensor, a pressure sensor, or a proximity sensor. Alternatively, the operation input unit 130 may be a physical component such as a button, a switch, or a lever.

(Sensor Unit 140)

The sensor unit 140 has a function of sensing, for example, the position (three-dimensional position coordinates, two-dimensional position coordinates, movement information, or the like) of the user, the motion of the limbs, the posture, the orientation of the head, a line-of-sight direction, a facial expression, or the like. More specifically, the sensor unit 140 may be a position information acquisition unit, a camera (inward/outward camera), a microphone, an acceleration sensor, an angular velocity sensor, a geomagnetic sensor, a biosensor (detection of the pulse, heart rate, sweating, blood pressure, body temperature, respiration, myoelectric value, brain wave, and the like), or the like.

Furthermore, the sensor unit 140 may include a nine-axis sensor including a three-axis gyro sensor, a three-axis acceleration sensor, and a three-axis geomagnetic sensor. Furthermore, the sensor unit 140 may be a line-of-sight detection sensor (infrared sensor) that detects the line of sight of the user.

(Display Unit 150)

The display unit 150 has a function of displaying the video data (image) of the user viewpoint in the virtual space. For example, the display unit 150 may be a display panel such as a liquid crystal display (LCD) or an organic electro luminescence (EL) display. Furthermore, the display unit 150 may be implemented by a non-transmissive HMD that covers the entire field of view. In this case, the display unit 150 displays a left-eye image and a right-eye image on the left and right screens respectively fixed to the left and right eyes of the user. The screen of the display unit 150 is implemented by, for example, a display panel such as a liquid crystal display (LCD) or an organic EL display, or a laser scanning display such as a retinal direct projection display. Furthermore, the display unit 150 may include an imaging optical system that enlarges and projects a display screen to form an enlarged virtual image having a predetermined view angle on the pupil of the user.

(Speaker 160)

The speaker 160 outputs sound data under the control of the control unit 120. For example, in a case where the user terminal 10 is implemented as an HMD, the speaker 160 may be implemented as a headphone worn on the head of the user, an earphone, or a bone conduction speaker.

(Storage Unit 170)

The storage unit 170 is implemented by a read only memory (ROM) that stores programs, operational parameters, and the like used for processing in the control unit 120, and a random access memory (RAM) that temporarily stores parameters and the like that change as appropriate.

In the storage unit 170 according to the present embodiment, for example, user avatar information (character 3D model data) may be stored, or the information regarding the virtual space received from the distribution server 20 may be stored.

Although the configuration of the user terminal 10 has been described above in detail, the configuration of the user terminal 10 according to the present disclosure is not limited to the example illustrated in FIG. 4. For example, the user terminal 10 may be implemented by a plurality of devices. Specifically, the user terminal 10 may be implemented by a system configuration including an output device (corresponding to at least the display unit 150 and the speaker 160) implemented by an HMD or the like and an information processing terminal (corresponding to at least the control unit 120) implemented by a smartphone, a tablet terminal, a PC, or the like.

Furthermore, the user terminal 10 may be a non-wearable device such as a smartphone or a tablet terminal.

3. Operation Processing

Next, operation processing in the information processing system according to the present embodiment will be specifically described with reference to the drawings.

3-1. Operation Processing at the Time of Live Distribution

Figure 5:
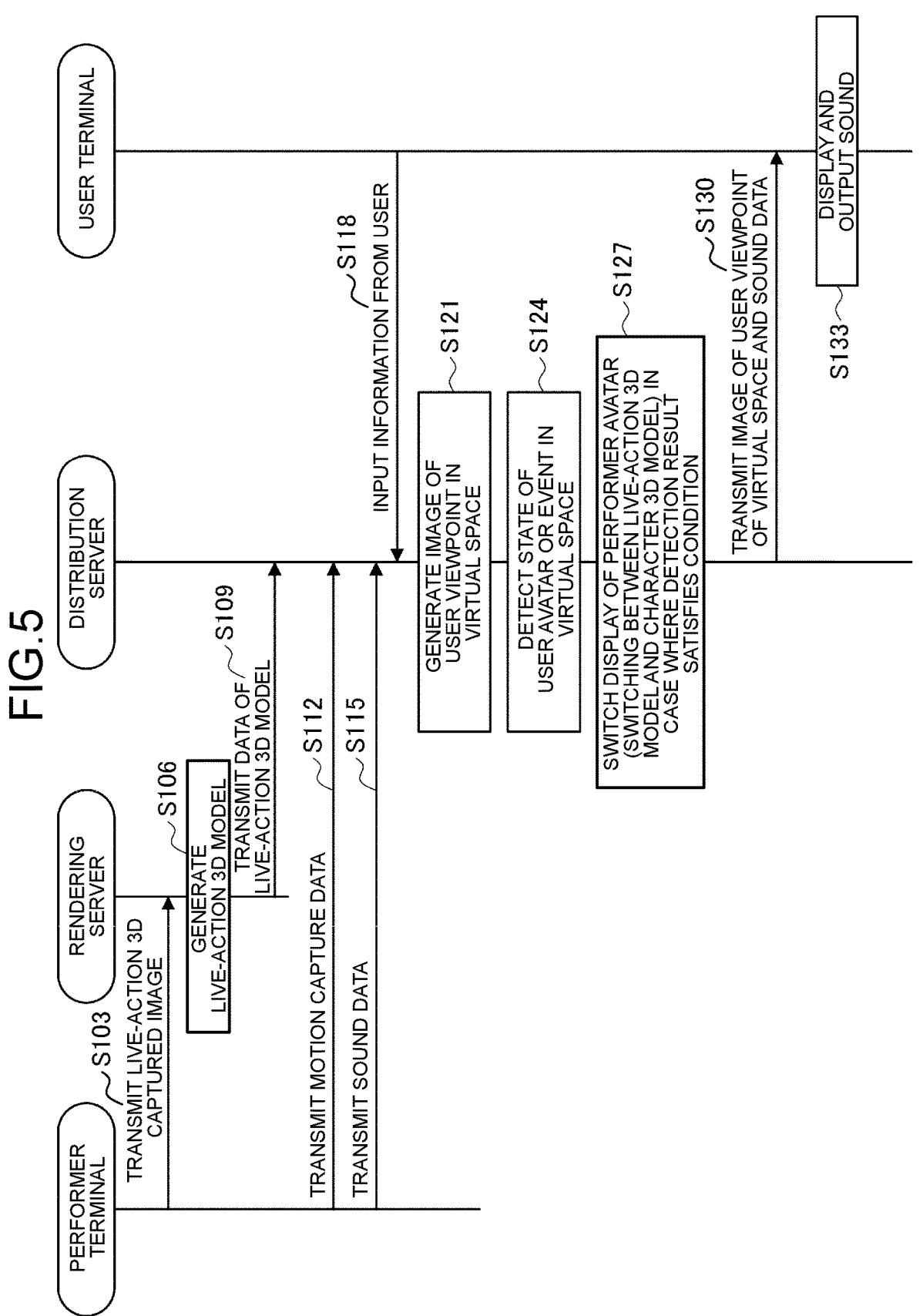
FIG. 5 is a sequence diagram illustrating an example of a flow of operation processing at the time of distributing a virtual reality (VR) event performed in real time according to the present embodiment.

First, operation processing at the time of distributing a VR event performed by a performer in real time will be described with reference to FIG. 5. FIG. 5 is a sequence diagram illustrating an example of a flow of operation processing at the time of distributing a VR event performed in real time according to the present embodiment.

As illustrated in FIG. 5, first, the performer terminal 30 transmits a live-action 3D captured image of the performer captured by the live-action 3D camera 33 to the rendering server 40 (Step S103).

Next, the rendering server 40 generates a live-action 3D model of the performer based on the received captured image (Step S106), and transmits data of the generated live-action 3D model to the distribution server 20 (Step S109).

Furthermore, the performer terminal 30 transmits motion capture data (hereinafter, also referred to as motion data) of the performer acquired by the motion capture camera 31 to the distribution server 20 (Step S112).

Further, the performer terminal 30 transmits sound data of the performer collected by the microphone 32 to the distribution server 20 (Step S115).

The processing in Steps S103 to S109, the processing in S112, and the processing in S115 described above can all be continuously executed in parallel (during execution of the event). As a result, various types of information of the performer acquired in real time are transmitted to the distribution server 20. In the distribution server 20, the virtual space management unit 221 updates the information regarding the virtual space based on these pieces of information. Although not illustrated in FIG. 5, input information from the event management terminal 50 is also appropriately transmitted to the distribution server 20. The input information from the event management terminal 50 is, for example, input information regarding the progress of the event, input information regarding production, an instruction to switch the display of the performer avatar, and the like.

Meanwhile, the user terminal 10 transmits input information from the user to the distribution server 20 (Step S118). The input information from the user is, for example, operation input information, real-time motion data of the user, or the like. Such input information is used, for example, to control the position, posture, and the like of the user avatar arranged in the virtual space. The distribution server 20 receives the input information from the user terminals 10 for all the users participating in the event. In the distribution server 20, the virtual space management unit 221 updates the information regarding the virtual space based on these pieces of information.

Subsequently, the virtual space information providing unit 222 of the distribution server 20 generates an image (video data) of the user viewpoint in the virtual space (Step S121). The user viewpoint can be calculated from the position and direction of the virtual camera arranged in the virtual space. Furthermore, a large number of virtual cameras may be arranged in the virtual space and associated with respective users. Furthermore, a large number of virtual cameras may be arranged in an audience seat area of the event venue in the virtual space. The virtual camera is not drawn in the virtual space. Furthermore, the image of the user viewpoint may be an image in which the entire user avatar is within the angle of view, or may be an image of the field of view of the user avatar (a hand of the user avatar or the like may be included in the field of view). Information for drawing the user avatar (data of the character 3D model of the user avatar) may be transmitted from the user terminal 10 to the distribution server 20 in advance, or the character 3D model provided by the distribution server 20 may be used.

Next, the performer display switching control unit 223 of the distribution server 20 detects a state of the user avatar or the event in the virtual space (Step S124).

Next, in a case where the detection result satisfies a condition, the performer display switching control unit 223 switches the display of the performer avatar (switching between the live-action 3D model and the character 3D model) (Step S127). The performer display switching control unit 223 performs processing of switching the display of the performer avatar included in the image of the user viewpoint generated in Step S121 from the live-action 3D model to the character 3D model or from the character 3D model to the live-action 3D model. Alternatively, after the performer display switching control unit 223 switches the set display of the performer avatar to the live-action 3D model or the character 3D model, the virtual space information providing unit 222 may perform the processing of generating the image of the user viewpoint in Step S121 (that is, the processing in Step S121 may be executed after the processing in Step S127).

Here, a case where switching of the display of the performer avatar is performed by detecting the state of the user avatar or the event in the virtual space has been described as an example. However, as described above, the display may be switched in accordance with an operation instruction from the user. In a case where the detection result does not satisfy the condition, the display of the performer avatar is not switched. For example, in a case where the display of the performer avatar is set to the character 3D model by default, the performer avatar is displayed as the character 3D model without being switched.

Next, the virtual space information providing unit 222 transmits the image (video data) of the user viewpoint in the virtual space and the sound data to the user terminal 10 (Step S130).

Then, the virtual space image display control unit 121 of the user terminal 10 displays the image of the user viewpoint in the virtual space and outputs the sound data (Step S133).

The processing in Steps S103 to S133 described above is repeated until the distribution of the VP, event ends.

Furthermore, the operation processing illustrated in FIG. 5 is an example, and the present disclosure is not limited to the example illustrated in FIG. 5. For example, the present disclosure is not limited to the order of the steps illustrated in FIG. 5. At least some steps may be executed in parallel or may be executed in the reverse order. In addition, all the processing illustrated in FIG. 5 do not have to necessarily be executed.

Furthermore, the generation of the image of the user viewpoint in the virtual space may be performed by the user terminal 10. In this case, in Step S130, the distribution server 20 transmits data for generating the image of the user viewpoint in the virtual space to the user terminal 10. Such data may include, for example, the information regarding the virtual space (information of each 3D object arranged in the virtual space (including information of other user avatars)), the position of the virtual camera corresponding to the user viewpoint, information regarding switching of the display of the performer avatar, motion data of the performer, the live-action 3D model of the performer, and the like. Furthermore, the data of the character 3D model of the performer avatar may be downloaded to the user terminal 10 in advance.

3-2. Operation Processing at the Time of Recording Distribution

Next, operation processing at the time of distributing a VR event recorded in advance will be described. In recording of a VR event performed in advance, for example, the processing in Steps S103 to S115 in the "operation processing at the time of live distribution" described with reference to FIG. 5 is practically performed from the start to the end of the event, and all pieces of data are stored in the distribution server 20 as VR content data. The VR content data includes all pieces of information regarding the VR event performed in the virtual space.

For example, the VR content data includes data of various 3D objects (character 3D data of the performer, character 3D data for the user avatar (general participant) set on the distributor side, data of various items, and the like) constituting the VR event, background data, other parameter data, and the like.

Furthermore, the VR content data includes video data at the time of the event in the virtual space (for example, a field-of-view image of a specific virtual camera viewpoint), sound data, data of the live-action 3D model of the performer, motion data of the performer, input information regarding the progress and production of the event, and the like. All of the pieces of data are chronological data from the start to the end of the event.

The distribution server 20 can distribute the VR event based on the VR content data recorded and stored in advance. Also in the distribution of the recorded VR event, the distribution server 20 can generate video data of the user viewpoint in the virtual space in real time and distribute the video data to the user terminal 10. Furthermore, the user avatar can move in the virtual space or change the line-of-sight direction according to input information (for example, input information such as a change in orientation of the head, movement of the position, and movement of the line-of-sight direction) from the user terminal 10.

Figure 6:
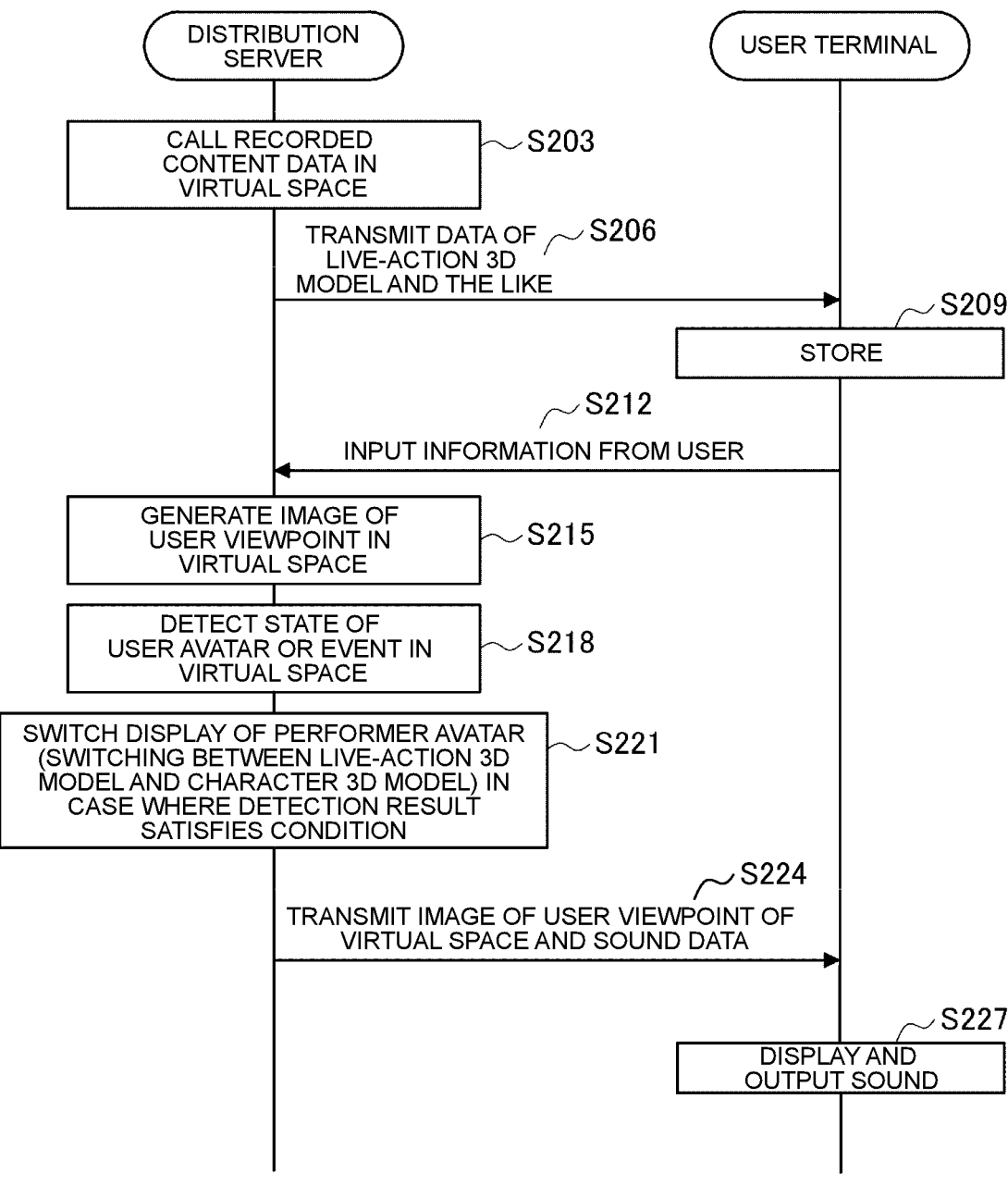
FIG. 6 is a sequence diagram illustrating an example of a flow of operation processing at the time of distributing a recorded VR event according to the present embodiment.

Hereinafter, an example of the operation processing at the time of recording distribution will be described with reference to FIG. 6. FIG. 6 is a sequence diagram illustrating an example of a flow of the operation processing at the time of distributing a recorded VR event according to the present embodiment.

As illustrated in FIG. 6, first, the distribution server 20 calls recorded VR content data (VR event data) in the virtual space (Step S203).

Next, the distribution server 20 transmits data (chronological data) of the live-action 3D model and the like in the VR event to the user terminal 10 (Step S206), and the user terminal 10 stores the received data (Step S209). In consideration of a processing load on the distribution server 20 side in the distribution of the VR event, a communication load (delay) between the distribution server 20 and the user terminal 10, and the like, a part of the data of the VR event may be downloaded to the user terminal 10 in advance.

Next, the user terminal 10 transmits input information from the user to the distribution server 20 (Step S212). The input information from the user is, for example, operation input information, real-time motion data of the user, or the like. Such input information is used, for example, to control the position, posture, and the like of the user avatar arranged in the virtual space. The distribution server 20 receives the input information from the user terminals 10 for all the users participating in the event. In the distribution server 20, the virtual space management unit 221 updates the information regarding the virtual space based on these pieces of information.

Next, the virtual space information providing unit 222 of the distribution server 20 generates an image (video data) of the user viewpoint in the virtual space (Step S215). The user viewpoint can be calculated from the position and direction of the virtual camera arranged in the virtual space. Furthermore, a large number of virtual cameras may be arranged in the virtual space and associated with respective users. Furthermore, a large number of virtual cameras may be arranged in an audience seat area of the event venue in the virtual space. The VR event recorded in advance is, for example, the performer avatar moving on the stage of the event venue in the virtual space, a voice of the performer, a sound of the venue, production, or the like, and the virtual space management unit 221 can also arrange a user avatar reflecting a real-time motion or the like of each user (viewer) at the time of distributing the recorded VR event in the audience seat area of the event venue.

Next, the performer display switching control unit 223 of the distribution server 20 detects a state of the user avatar or the event in the virtual space (Step S218).

Next, in a case where the detection result satisfies a condition, the performer display switching control unit 223 switches the display of the performer avatar (switching between the live-action 3D model and the character 3D model) (Step S221). The performer display switching control unit 223 performs processing of switching the display of the performer avatar included in the image of the user viewpoint generated in Step S215 from the live-action 3D model to the character 3D model or from the character 3D model to the live-action 3D model. Alternatively, after the performer display switching control unit 223 switches the set display of the performer avatar to the live-action 3D model or the character 3D model, the virtual space information providing unit 222 may perform the processing of generating the image of the user viewpoint in Step S215 (that is, the processing in Step S215 may be executed after the processing in Step S221).

Here, a case where switching of the display of the performer avatar is performed by detecting the state of the user avatar or the event in the virtual space has been described as an example. However, as described above, the display may be switched in accordance with an operation instruction from the user. In a case where the detection result does not satisfy the condition, the display of the performer avatar is not switched. For example, in a case where the display of the performer avatar is set to the character 3D model by default, the performer avatar is displayed as the character 3D model without being switched.

Next, the virtual space information providing unit 222 transmits the image (video data) of the user viewpoint in the virtual space and the sound data to the user terminal 10 (Step S224). The distribution of the image (video data) of the user viewpoint and the sound data by the virtual space information providing unit 222 may be so-called streaming distribution.

Then, the virtual space image display control unit 121 of the user terminal 10 displays the image of the user viewpoint in the virtual space and outputs the sound data (Step S227).

As described in Step S206 above, in a case where the data of the live-action 3D model of the performer is downloaded to the user terminal 10 in advance, the virtual space information providing unit 222 of the distribution server 20 may transmit an instruction to perform switching to the live-action 3D model together with the image of the user viewpoint in the virtual space and the sound data in Step S224 above. In this case, the virtual space image display control unit 121 of the user terminal 10 performs processing of switching (synthesizing) the display of the performer avatar appearing in the image of the user viewpoint in the virtual space received from the distribution server 20 to the live-action 3D model acquired in advance, and displays the live-action 3D model. Since the data of the live-action 3D model acquired in advance is chronological data, the virtual space image display control unit 121 can synthesize images of the live-action 3D model whose times are synchronized based on, for example, information regarding an elapsed time from the start of the event.

Furthermore, the data of the character 3D model and the motion data of the performer may be downloaded to the user terminal 10 in advance (before the event starts). The distribution server 20 may transmit information (for example, the performer ID and the three-dimensional coordinate information) indicating the position of the performer in the virtual space (the position of the performer avatar on the stage) together with the image (not including the display of the performer avatar) of the user viewpoint in the virtual space and the sound data, and superimpose and display the display (the character 3D model or the live-action 3D model) of the performer avatar on the received image of the user viewpoint in the virtual space in the user terminal 10.

The operation processing at the time of recording distribution according to the present embodiment has been described above. The operation processing illustrated in FIG. 6 is an example, and the present disclosure is not limited to the example illustrated in FIG. 6. For example, the present disclosure is not limited to the order of the steps illustrated in FIG. 6. At least some steps may be executed in parallel or may be executed in the reverse order. In addition, all the processing illustrated in FIG. 6 do not have to necessarily be executed.

For example, the distribution server 20 may transmit the data of the live-action 3D model to the user terminal 10 together with the image of the user viewpoint in the virtual space and the sound data only while performing control to perform switching to the live-action 3D model without downloading the data of the live-action 3D model in advance to the user terminal 10. In this case, in the user terminal 10, processing of switching (synthesizing) the display of the performer avatar appearing in the image of the user viewpoint to the received live-action 3D model is performed, and the live-action 3D model is displayed.

Furthermore, in the operation processing described above, the distribution server 20 generates the image of the user viewpoint in the virtual space, but the present disclosure is not limited thereto. For example, the user terminal 10 may download information (including the data of the VR event) for constructing the virtual space in advance (before the event starts), and the user terminal 10 may generate the image of the user viewpoint in the virtual space. At this time, the user terminal 10 may continuously transmit the input information of the user (the motion data of the user avatar or the like) to the distribution server 20, and receive motion data of other user avatars or the like from the distribution server 20. As a result, the real-time motion and the like of each user avatar in the event venue are shared by all the participants of the event.

4. Modified Example

4-1. Case where Switching Control is Performed by User Terminal

In the embodiment described above, switching of the display of the performer avatar is controlled by the distribution server 20 as described with reference to FIG. 3, but the present disclosure is not limited thereto. For example, the display of the performer avatar may be switched in the user terminal 10. Hereinafter, a user terminal 10' according to a modified example of the present embodiment will be described.

Configuration Example

Figure 7:
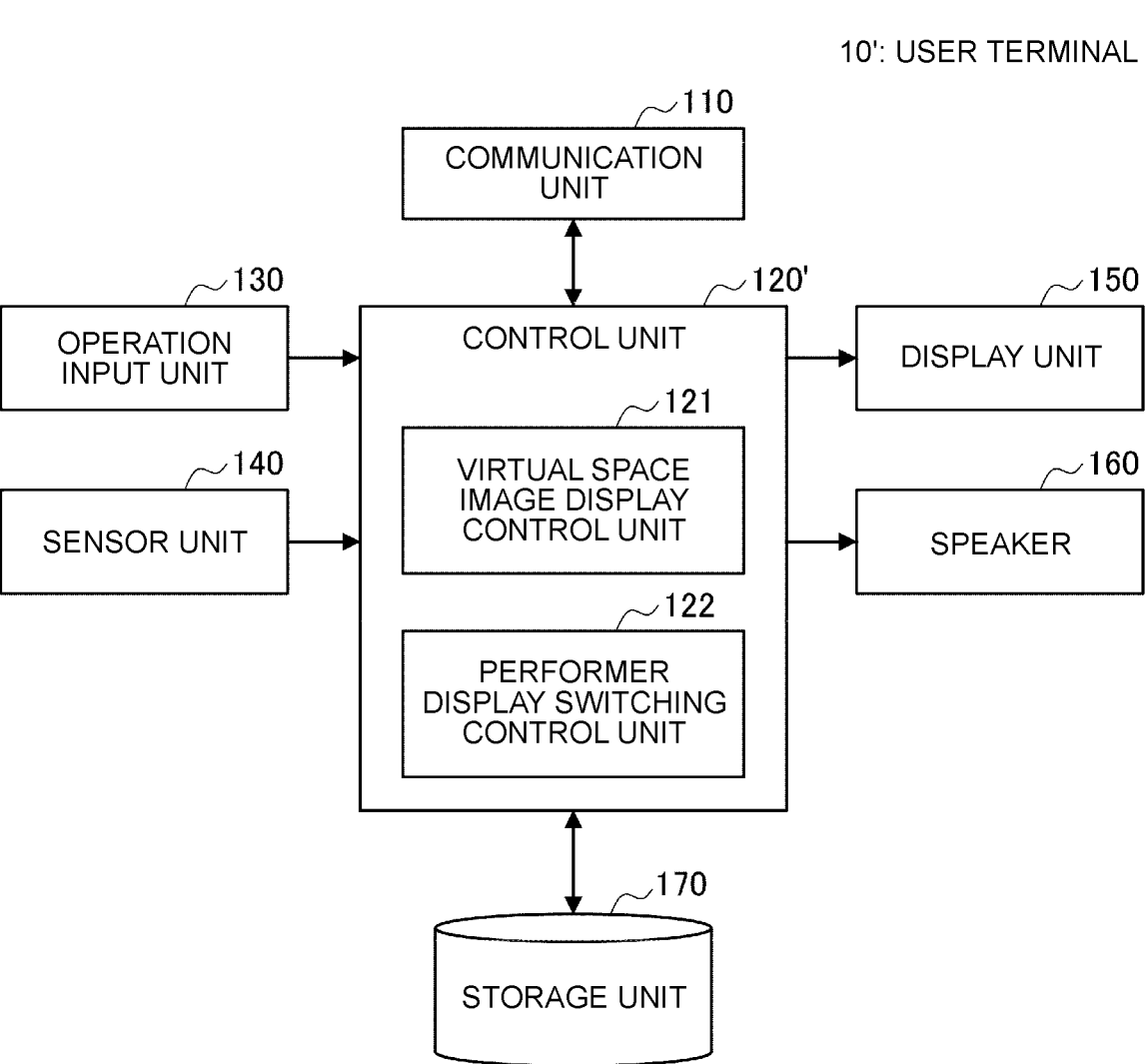
FIG. 7 is a block diagram illustrating an example of a configuration of a user terminal according to a modified example of the present embodiment.

FIG. 7 is a block diagram illustrating an example of a configuration of the user terminal 10' according to the modified example of the present embodiment. The configuration illustrated in FIG. 7 is different from the configuration illustrated in FIG. 4 in that a control unit 120' that also functions as a virtual space image display control unit 121 and a performer display switching control unit 122 is provided. Other configurations are similar to those in FIG. 4, and thus a detailed description thereof is omitted here.

Similarly to the performer display switching control unit 223 described with reference to FIG. 3, the performer display switching control unit 122 controls switching of whether to display the performer avatar in the virtual space as the character 3D model or the live-action 3D model. The switching may be performed according to an instruction from the user or may be performed according to an instruction from the distributor side. Furthermore, the performer display switching control unit 122 may automatically control the switching according to the state of at least one user avatar in the virtual space or the state of the event performed in the virtual space. More specific examples thereof are as described above.

(Operation Processing)

Figure 8:
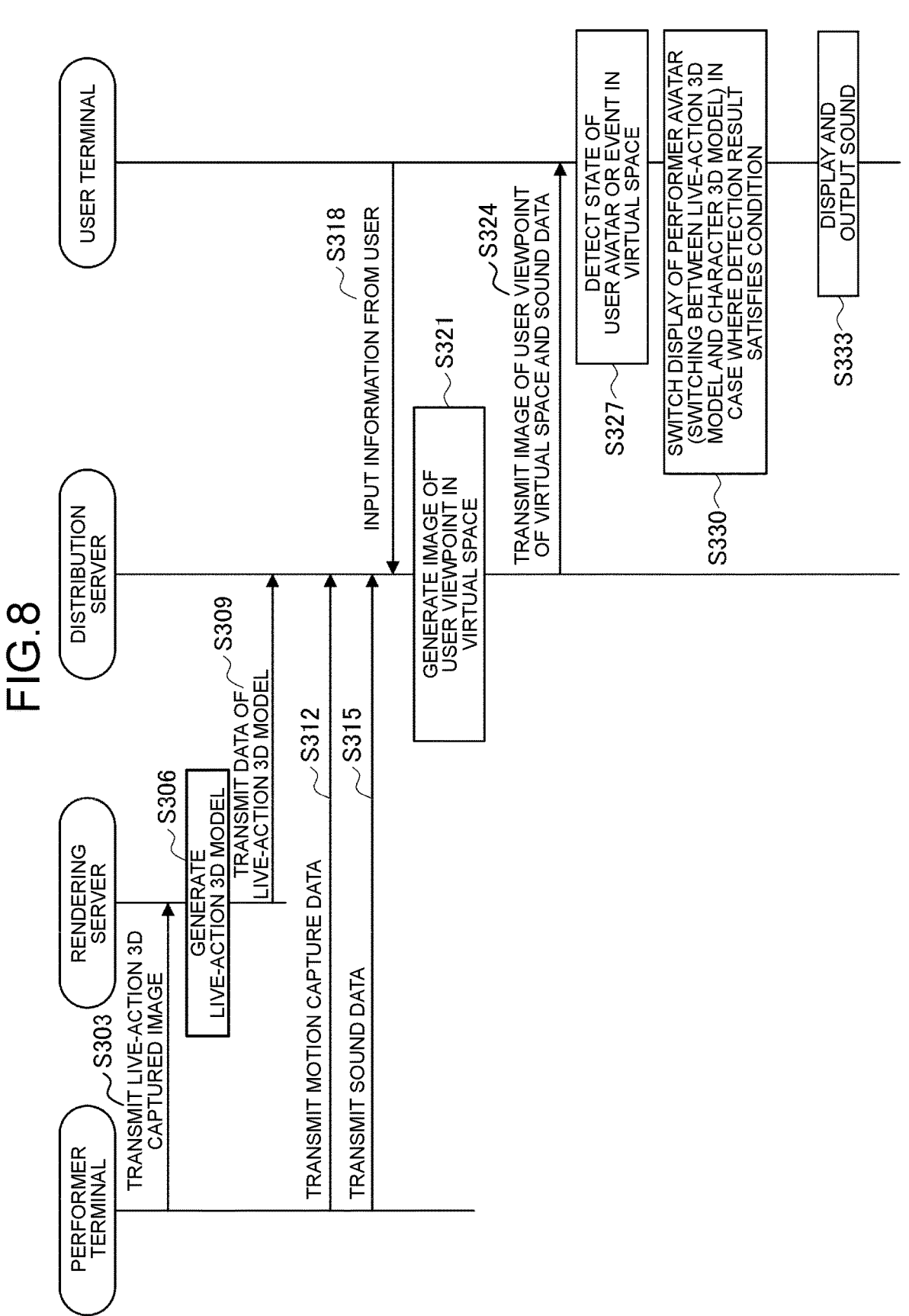
FIG. 8 is a sequence diagram illustrating an example of a flow of operation processing at the time of distributing live a VR event according to the present modified example of the present embodiment.

Next, operation processing of the present modified example will be described with reference to FIG. 8. FIG. 8 is a sequence diagram illustrating an example of a flow of operation processing at the time of distributing live a VR event according to the present modified example.

Processing in Steps S303 to S321 illustrated in FIG. 8 is similar to the processing in Steps S103 to S121 illustrated in FIG. 5.

Then, the distribution server 20 transmits the image (video data) of the user viewpoint of the virtual space and the sound data to the user terminal 10 (Step S324). At this time, the distribution server 20 may also transmit information used in switching control to be described below, such as information regarding all the user avatars in the event venue and information regarding the state of the event. The transmission of the image of the user viewpoint from the distribution server 20 to the user terminal 10 may be so-called live streaming distribution. At this time, for example, in a case where the display of the performer avatar is set to the character 3D model by default, the character 3D model is displayed as the performer avatar in the image of the user viewpoint streamed live. Furthermore, the distribution server 20 may also transmit the data of the live-action 3D model in the live streaming distribution, so that the display of the performer avatar can be appropriately switched on the user terminal 10' side.

Next, the performer display switching control unit 122 of the user terminal 10 detects a state of the user avatar or the event in the virtual space (Step S327).

Next, in a case where the detection result satisfies a condition, the performer display switching control unit 122 switches the display of the performer avatar (switching between the live-action 3D model and the character 3D model) (Step S330). Specifically, the performer display switching control unit 122 performs processing of switching the display of the performer avatar included in the image of the user viewpoint received from the distribution server 20 from the live-action 3D model to the character 3D model or from the character 3D model to the live-action 3D model. For example, the motion data of the performer (data applied to the character 3D model) and the data of the live-action 3D model are distributed in real time from the distribution server 20, and the user terminal 10 can appropriately switch the display of the performer avatar. The data of the character 3D model of the performer is downloaded to the user terminal 10 in advance.

Here, a case where switching of the display of the performer avatar is performed by detecting the state of the user avatar or the event in the virtual space has been described as an example. However, the performer display switching control unit 122 may switch the display in accordance with an operation instruction from the user. In a case where the detection result does not satisfy the condition, the display of the performer avatar is not switched. For example, in a case where the display of the performer avatar is set to the character 3D model by default, the performer avatar may be displayed as the character 3D model.

Then, the virtual space image display control unit 121 of the user terminal 10 displays the image of the user viewpoint in the virtual space and outputs the sound data (Step S333).

The operation processing according to the modified example of the present embodiment has been described above. The operation processing illustrated in FIG. 8 is an example, and the present disclosure is not limited to the example illustrated in FIG. 8.

For example, the processing in Step S321 may be performed by the virtual space image display control unit 121 of the user terminal 10. Specifically, the user terminal 10 can download information for constructing the virtual space from the distribution server 20 in advance, construct the virtual space locally, and generate the image of the user viewpoint locally. Information regarding the event performed in the virtual space (three-dimensional position information of the performer, the motion data of the performer, the live-action 3D model of the performer, information regarding production, the sound data, and the like) is continuously distributed from the distribution server 20 in real time and is synchronized with the virtual space locally constructed by the user terminal 10. Further, the user terminal 10 may continuously transmit the input information of the user (the motion data of the user avatar or the like) to the distribution server 20, and receive motion data of other user avatars or the like from the distribution server 20. As a result, the real-time motion and the like of each user avatar in the event venue are shared by all the participants of the event. Then, the performer display switching control unit 122 locally determines switching of the display of the performer avatar according to the operation instruction of the user, the state of the user avatar, the state of the event, or the like. The virtual space image display control unit 121 switches the display of the performer avatar in accordance with the determination made by the performer display switching control unit 122, and then performs processing of generating the image of the user viewpoint in the virtual space to perform display control.

4-2. Application to Augmented Reality (AR)

Although the switching of the display of the performer avatar in the VR content has been described as an example in the above-described embodiment, the present disclosure is also applicable to augmented reality (AR) and mixed reality (MR).

For example, a system in which a live-action video of a performer and a character video corresponding to the performer are distributed from a server to a user terminal is assumed. In such a system, first, either the live-action video of the performer or the character video is displayed on a display of a first user terminal (for example, a television device, a PC, or a screen). Then, a user holds a second user terminal (for example, a smartphone, a tablet terminal, or a transmissive glasses-type device) over the first user terminal, and performs transparent display of a captured image of the display of the first user terminal. Then, in the transparent display of the second user terminal, the corresponding character video is superimposed and displayed on the live-action video of the performer appearing on the display of the first user terminal. Alternatively, in the transparent display of the second user terminal, the corresponding live-action video of the performer is superimposed and displayed on the character video displayed on the display of the first user terminal. In this way, it is possible to switch an object on a content on the spot according to the user's preference. In a case where there are a plurality of performers, a live-action video or a character video of the performer may be associated based on position information such as a standing position of the performer.

Control of superimposing and displaying a live-action video or a character video of a performer by holding a smartphone or the like over a target can also be implemented in a virtual space. For example, when a user avatar holds a virtual smartphone or the like (3D object) over a stage while viewing an event in a virtual space, a live-action video or a character video may be displayed on a display screen of the virtual smartphone.

5. Supplement

The preferred embodiments of the present disclosure have been described in detail above with reference to the accompanying drawings, but the present technology is not limited to such examples. It is obvious that a person having ordinary knowledge in the technical field of the present disclosure can conceive various changes or modifications within the scope of the technical idea described in the claims, and it is naturally understood that the changes or modifications also fall within the technical scope of the present disclosure.

For example, in consideration of a processing load on the distribution server 20 side in the distribution of the VR event, a communication load (delay) between the distribution server 20 and the user terminal 10, and the like, a part of the data of the VR event may be downloaded to the user terminal 10 in advance. Furthermore, at least a part of each processing executed by the distribution server 20 described above may be executed by the user terminal 10 in consideration of a processing load and the like. In order to implement the system according to the present disclosure, various variations are assumed as to which device has what data and which processing is executed where, and the present disclosure is not limited to the above-described example.

In addition, it is also possible to create a computer program for causing hardware such as the CPU, the ROM, and the RAM built in the user terminal 10, the user terminal 10', or the distribution server 20 described above to execute the function of the user terminal 10, the user terminal 10', or the distribution server 20. Furthermore, a computer-readable storage medium storing the computer program is also provided.

Furthermore, the effects described in the present specification are merely illustrative or exemplary, and are not restrictive. That is, the technology according to the present disclosure can exhibit other effects obvious to those skilled in the art from the description of the present specification together with or instead of the above effects.

Note that the present technology can also have the following configurations.

(1)

An information processing device comprising:

a control unit that performs control to output information regarding an image of a user viewpoint in a virtual space, wherein the control unit performs control to switch a display corresponding to a performer included in the image between a live-action image generated based on a captured image of the performer and a character image corresponding to the performer, according to a result of detecting a state of at least one user in the virtual space or a state of the virtual space.

(2)

The information processing device according to (1), wherein the state of at least one user in the virtual space is a state related to at least one user avatar participating in an event performed in the virtual space.

(3)

The information processing device according to (1) or (2), wherein the state of the virtual space is a specific state of an event performed in the virtual space.

(4)

The information processing device according to (3), wherein the specific state of the event is occurrence of a specific production or a specific time zone in a music.

(5)

The information processing device according to any one of (1) to (4), wherein the control unit switches the display corresponding to the performer to the live-action image or the character image in a case where at least one of the state of at least one user or the state of the virtual space satisfies a condition.

(6)

The information processing device according to any one of (1) to (5), wherein the live-action image is a live-action image including three-dimensional information of the performer, and the character image is an image of a three-dimensional character model that moves based on three-dimensional motion capture data of the performer.

(7)

The information processing device according to any one of (1) to (6), wherein the control unit performs control to output the information regarding the image of the user viewpoint in an event performed in real time in the virtual space or an event recorded in advance in the virtual space.

(8)

The information processing device according to any one of (1) to (7), wherein the control unit performs control to output the information regarding the image of the user viewpoint to a user terminal.

(9)

The information processing device according to any one of (1) to (8), wherein the control unit switches the display corresponding to the performer included in the image of the user viewpoint for each user participating in an event performed in the virtual space or for all users in a uniform manner.

(10)

The information processing device according to any one of (1) to (7), wherein the control unit performs control to display and output the image of the user viewpoint in the virtual space on a display unit based on information received from a server that distributes information regarding the virtual space.

(11)

The information processing device according to (10), wherein the control unit performs control to switch the display corresponding to the performer included in the image of the user viewpoint between the live-action image and the character image based on an operation instruction from the user.

(12)

An information processing method executed by a processor, the information processing method comprising:

performing control to output information regarding an image of a user viewpoint in a virtual space; and performing control to switch a display corresponding to a performer included in the image between a live-action image generated based on a captured image of the performer and a character image corresponding to the performer, according to a result of detecting a state of at least one user in the virtual space or a state of the virtual space.

(13)

A program that causes a computer to function as:

a control unit that performs control to output information regarding an image of a user viewpoint in a virtual space, wherein the control unit performs control to switch a display corresponding to a performer included in the image between a live-action image generated based on a captured image of the performer and a character image corresponding to the performer, according to a result of detecting a state of at least one user in the virtual space or a state of the virtual space.

(14)

A system including: a server that distributes information of a virtual space; and a user terminal that displays an image of a user viewpoint in the virtual space, in which the server includes a control unit that performs control to transmit information regarding the image of the user viewpoint to the user terminal, and the control unit performs control to switch a display corresponding to a performer included in the image between a live-action image generated based on a captured image of the performer and a character image corresponding to the performer, according to a result of detecting a state of at least one user in the virtual space or a state of the virtual space.

REFERENCE SIGNS LIST

10 USER TERMINAL
121 VIRTUAL SPACE IMAGE DISPLAY CONTROL UNIT
122 PERFORMER DISPLAY SWITCHING CONTROL UNIT
20 DISTRIBUTION SERVER
221 VIRTUAL SPACE MANAGEMENT UNIT
222 VIRTUAL SPACE INFORMATION PROVIDING UNIT
223 PERFORMER DISPLAY SWITCHING CONTROL UNIT

The invention claimed is:

1. An information processing system comprising:
circuitry configured to control to output information regarding an image generated for each user viewpoint of at least one user in a virtual space, control to switch a display corresponding to a performer included in the image between a live-action image generated based on a captured image of the performer and a character image corresponding to the performer, according to a detection result of detecting at least one of a state of the at least one user in the virtual space or a state of the virtual space, and control to switch the display corresponding to the performer included in the image of the user viewpoint for each individual user according to the detection result of detecting the state of each individual user.

2. The information processing system according to claim 1, wherein the state of at least one user in the virtual space is a state related to at least one user avatar participating in an event performed in the virtual space.

3. The information processing system according to claim 1, wherein the state of the virtual space is a specific state of an event performed in the virtual space.

4. The information processing system according to claim 3, wherein the specific state of the event is occurrence of a specific production or a specific time zone in a music.

5. The information processing system according to claim 1, wherein the circuitry switches the display corresponding to the performer to the live-action image or the character image in a case where at least one of the state of at least one user or the state of the virtual space satisfies a condition.

6. The information processing system according to claim 1, wherein the live-action image includes three-dimensional information of the performer, and wherein the character image is an image of a three-dimensional character model that moves based on three-dimensional motion capture data of the performer.

7. The information processing system according to claim 1, wherein the circuitry performs control to output the information regarding the image of the user viewpoint in an event performed in real time in the virtual space or an event recorded in advance in the virtual space.

8. The information processing system according to claim 1, wherein the circuitry performs control to output the information regarding the image of the user viewpoint to a user terminal.

9. The information processing system according to claim 1, wherein the circuitry switches the display corresponding to the performer included in the image of the user viewpoint for all users in a uniform manner according to the detection result of detecting the state of the virtual space.

10. The information processing system according to claim 1, wherein the circuitry performs control to display and output the image of the user viewpoint in the virtual space on a display based on information received from a server that distributes information regarding the virtual space.

11. The information processing system according to claim 10, wherein the circuitry performs control to switch the display corresponding to the performer included in the image of the user viewpoint between the live-action image and the character image based on an operation instruction from the user.

12. An information processing method executed by a processor, the information processing method comprising:

controlling to output information regarding an image generated for each user viewpoint of at least one user in a virtual space;

controlling to switch a display corresponding to a performer included in the image between a live-action image generated based on a captured image of the performer and a character image corresponding to the performer, according to a detection result of detecting at least one of a state of the at least one user in the virtual space or a state of the virtual space; and controlling to switch the display corresponding to the performer included in the image of the user viewpoint for each individual user according to the detection result of detecting the state of each individual user.

13. The information processing method according to claim 12, wherein the state of at least one user in the virtual space is a state related to at least one user avatar participating in an event performed in the virtual space.

14. The information processing method according to claim 12, wherein the state of the virtual space is a specific state of an event performed in the virtual space.

15. The information processing method according to claim 12, wherein the circuitry switches the display corresponding to the performer to the live-action image or the character image in a case where at least one of the state of at least one user or the state of the virtual space satisfies a condition.

16. The information processing method according to claim 12, wherein the live-action image includes three-dimensional information of the performer, and wherein the character image is an image of a three-dimensional character model that moves based on three-dimensional motion capture data of the performer.

17. The information processing method according to claim 12, further comprising:

controlling to output the information regarding the image of the user viewpoint in an event performed in real time in the virtual space or an event recorded in advance in the virtual space.

18. The information processing method according to claim 12, further comprising:

controlling to output the information regarding the image of the user viewpoint to a user terminal.

19. The information processing method according to claim 12, further comprising:

switching the display corresponding to the performer included in the image of the user viewpoint for all users in a uniform manner according to the detection result of detecting the state of the virtual space.

20. The information processing method according to claim 12, further comprising:

displaying and outputting the image of the user viewpoint in the virtual space on a display based on information received from a server that distributes information regarding the virtual space.

21. A non-transitory computer-readable storage medium having embodied thereon a program, which when executed by a computer causes the computer to execute a method, the method comprising:

controlling to output information regarding an image generated for each user viewpoint of at least one user in a virtual space;

controlling to switch a display corresponding to a performer included in the image between a live-action image generated based on a captured image of the performer and a character image corresponding to the performer, according to a detection result of detecting at least one of a state of the at least one user in the virtual space or a state of the virtual space; and controlling to switch the display corresponding to the performer included in the image of the user viewpoint for each individual user according to the detection result of detecting the state of each individual user.

* * * * *